Figure 1:
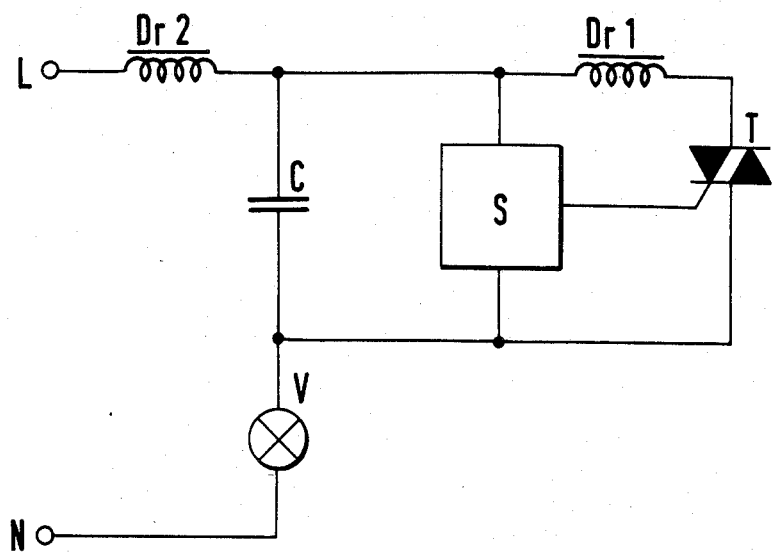

United States Patent [19]

Kneisel

[11] Patent Number: 4,612,480
[45] Date of Patent: Sep. 16, 1986

[54] CIRCUIT ARRANGEMENT FOR THE RADIO INTERFERENCE SUPPRESSION IN BRIGHTNESS CONTROL DEVICES USING THE PHASE GATING PRINCIPLE

[75] Inventor: Dietmar Kneisel, Schalksmühle, Fed. Rep. of Germany

[73] Assignee: Brown, Boveri & Cie AG, Mannheim, Fed. Rep. of Germany

[21] Appl. No.: 511,167
[22] PCT Filed: Sep. 27, 1982
[86] PCT No.: PCT/EP82/00216
§ 371 Date: Jun. 6, 1983
§ 102(e) Date: Jun. 6, 1983
[87] PCT Pub. No.: WO83/01363
PCT Pub. Date: Apr. 14, 1983

[30] Foreign Application Priority Data

Oct. 6, 1981 [DE] Fed. Rep. of Germany ....... 3139673

[51] Int. Cl.$^4$ .................. H05B 37/02; H05B 39/04; H05B 41/36
[52] U.S. Cl. .................. 315/224; 315/DIG. 4; 315/362; 333/175; 333/181
[58] Field of Search .......... 315/DIG. 4, 362, 224, 315/200; 333/176, 175, 181

[56] References Cited

U.S. PATENT DOCUMENTS

| | | | |
|---|---|---|---|
| 3,525,900 | 8/1970 | Skirvin et al. | 315/224 |
| 3,886,405 | 5/1975 | Kubo | 315/224 |
| 3,909,623 | 9/1975 | Wagner | 333/182 |
| 4,383,203 | 5/1983 | Stanley | 333/175 |
| 4,394,631 | 7/1983 | Paulic | 333/175 |
| 4,410,839 | 10/1983 | Dobkin | 315/362 |
| 4,490,625 | 12/1984 | Dilly | 315/362 |
| 4,491,903 | 1/1985 | Montague | 333/181 |

FOREIGN PATENT DOCUMENTS 2032664 5/1980 United Kingdom .............. 315/362

Primary Examiner—Saxfield Chatmon
Attorney, Agent, or Firm—Herbert L. Lerner; Laurence A. Greenberg

[57] ABSTRACT

Circuit arrangement using carrier frequency control voltage on low voltage power lines for radio interference suppression in brightness control devices using the phase gating principle, comprising a radio frequency interference filter including an interference suppression choke coil and wherein a semiconductor switch combined with the interference suppression choke coil is connected in series with the load circuit which includes at least one incandescent lamp and wherein a capacitor is shunted in parallel with the series-connection of the interference suppression choke and the semiconductor component, including a further choke in the load circuit which presents a high impedance to the carrier-frequency control voltage, thereby preventing the loading of the control voltage on the power lines caused by the low impedance of the capacitor at the carrier frequency when the semiconductor component is in the non-conducting state.

2 Claims, 3 Drawing Figures

CIRCUIT ARRANGEMENT FOR THE RADIO INTERFERENCE SUPPRESSION IN BRIGHTNESS CONTROL DEVICES USING THE PHASE GATING PRINCIPLE

The invention relates to a circuit arrangement for the radio interference suppression in brightness control devices for incondescent lamps according to the phase gating principle, wherein a semiconductor switch is connected in series with an interference suppression choke and the load circuit, and having a capacitor shunted across the semiconductor switch and the interference suppression choke.

The known brightness control devices of this general type, which can be operated manually, have a disconnect switch, by which the circuit arrangement can be separated from the power line.

Brightness control devices which are designed as remote-controlled switches and are switched remotely by means of a high frequency transmitter, using low-voltage lines for transmitting transmitting frequencies are on the other hand continuously connected to the line. In the latter case, the radio interference suppression components of these brightness control devices, consisting of a choke and a capacitor, are continuously connected to the line, and due to the resistance of incandescent bulbs which have low resistance in the "off" condition, the transmitting voltage is heavily attenuated by the capacitor.

Thereby, the number of brightness control devices which can maximally be connected within a remote-control system is greatly limited. Within such a system, the a transmitter which can operate, for instance, 256 switching points, at most 16 brightness control devices can therefore be connected. In many cases, however, a larger number of brightness control devices must be able to be connected. Since the transmitter voltage within a system must not fall below the response threshold, the arrangement of brightness control devices is limited due to the described conditions.

In order to overcome this problem, it has been attempted to design the radio interference suppression circuit in such a way that a capacitor is used which has substantially less capacitance, for instance, only about 30% of that customary capacitance, but using instead a radio interference suppression choke with more coil turns. The suppression circuit values that were required were obtained thereby, but the radio interference suppression choke was made more expensive due to both the larger number of turns and the additional material required as well as the increased manufacturing costs. In addition, a problem of greater temperature rise in the coil arose, so that the overall size of the entire circuit was adversely affected thereby.

Finally, by this measure it was not achieved to operate a number greater than maximally 16 brightness control devices within a system.

It is an object of the invention to increase the number of remotely controllable brightness control devices in a remote-controlled system with carrier-frequency utilization of low-voltage lines without heavily loading the high-frequency transmitting voltage.

According to the invention, the problem is solved by the provision that the attenuation of the radio interference suppression components, is cancelled in devices using high-frequency utilization of low-voltage lines, if the semiconductor switch does not conduct, by arranging a further choke in the load circuit. Because of this arrangement, the series circuit of choke and capacitor becomes high-impedance in the "off" condition. Thus, the heavy loading of the high-frequency transmitting voltage, on the low-voltage line is cancelled.

The invention further includes a ferrite core with only few coil turns as the further choke. Due to the fact that the ferrite core has the effect of quickly saturating the choke when current flows, it is achieved that the further choke loses its detrimental effect on the radio interference suppression circuit when the remote-controlled brightness control device is switched on, and thereby, effective radio interference suppression is achieved in the switched-on condition.

Figure 2:
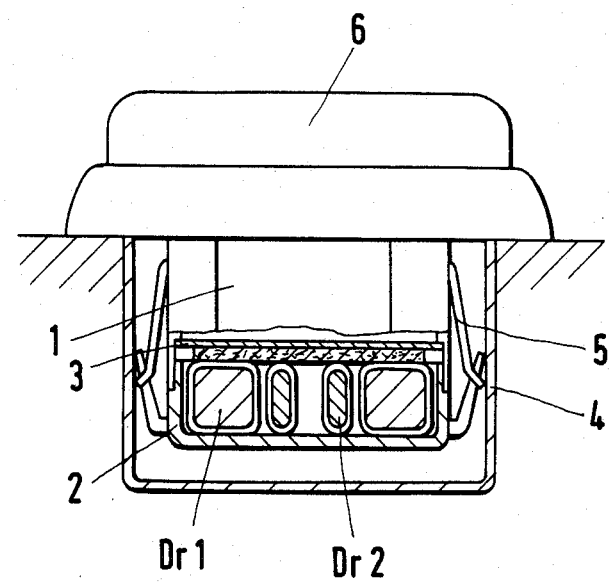
Figure 3:
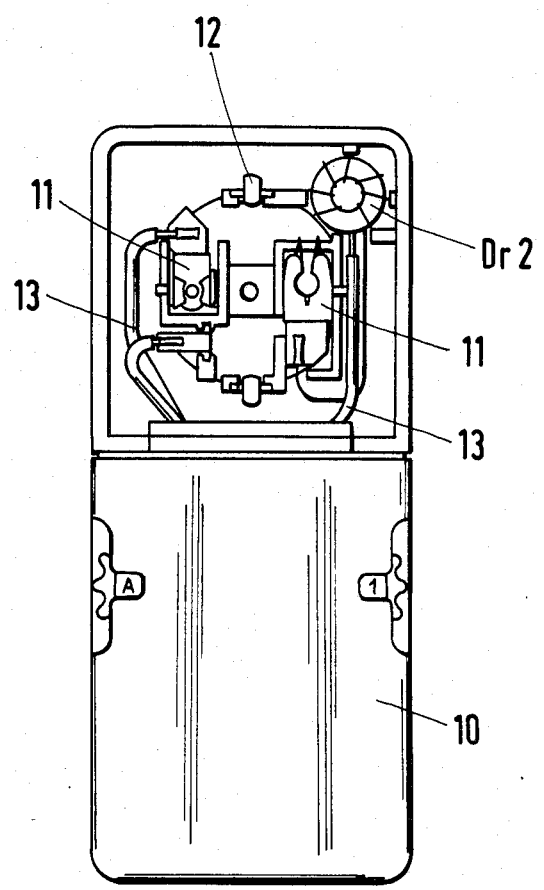

The circuit arrangement according to the invention is shown in the drawing in several embodiment examples, where FIG. 1 shows a schematic circuit diagram, of the arrangement, FIG. 2 shows the construction of a remotely controlled brightness control device for under-plaster installation, seen partly in cross section, and FIG. 3 shows a remotely controlled brightness control device in an add-on construction as a plug-in module.

It can be seen in the circuit diagram according to FIG. 1 that the remote controlled brightness control device can be connected to a low-voltage line network by the terminals L and N. The brightness control device consists of components well known for devices of this type such as a triac T, used as the semiconductor switch which obtains its firing pulses from the control S in accordance with the setting of this control.

The interference suppression choke Dr1 and the capacitor C serve for radio interference suppression in a manner which is known. The consumer is V, which may be an incandescent lamp or another controllable apparatus, such as a motor for instance. According to the invention, the further choke Dr2 is arranged in series with the capacitor C in the load circuit. This further choke Dr2 consists of a ferrite core with only a few coil turns wound thereon. In this way, the further choke Dr2 requires only a very small volume.

As may be seen from FIG. 2, this further choke Dr2 can be arranged, in the construction of the brightness control device especially for concealed installation, within the winding window of the interference suppression choke Dr1. This brightness control device for concealed installation consists of a two-part housing, namely, an upper housing part 1 and a lower housing part 2, between which a circuit board 3 with the other electronic components, on which for instance the triac T and the elements of the control device S is mounted. Underneath the circuit board 3 within the lower housing part 2, the interference suppression choke Dr1 and the further choke Dr2 are mounted. The brightness control device can be fastened in an under-plaster box 4 in a known manner by means of spreading tabs 5. It is covered by a cover plate 6 toward the outside.

In the presentation according to FIG. 3, the brightness control device is mounted with its electronic components, including its selecting switches provided for the remote selection of the equipment and the selection of the code for remote operation which is not part of the instant invention and is therefore not shown, in a housing 10, to which a connector part with the jacks 11 and a protective contact bracket 12 is added. As can be seen from the connector part, shown open, the further choke Dr2 is installed here in an empty space of the connector part and can be attached there by suitable accommodations in the housing. The electrical connection of the coil winding of this further choke Dr2 can be performed in a very simple manner between the jack 11 and the one input line 13 of the brightness control device.

I claim:

1. Circuit arrangement using carrier frequency control voltage on low voltage power lines for radio interference suppression in brightness control devices using the phase gating principle, comprising a radio frequency interference filter including an interference suppression choke coil and wherein a semiconductor switch combined with the interference suppression choke coil is connected in series with the load circuit which includes at least one incandescent lamp and wherein a capacitor is shunted in parallel with the series-connection of the interference suppression choke and the semiconductor component, including a further choke in the load circuit which presents a high impedance to the carrier-frequency control voltage, thereby preventing the loading of the control voltage on the power lines caused by the low impedance of said capacitor at the carrier frequency when the semiconductor component is in the non-conducting state.

2. Circuit arrangement according to claim 1, comprising a ferrite core with only a few coil turns as the further choke.

* * * * *